United States Patent Office 3,401,742
Patented Sept. 17, 1968

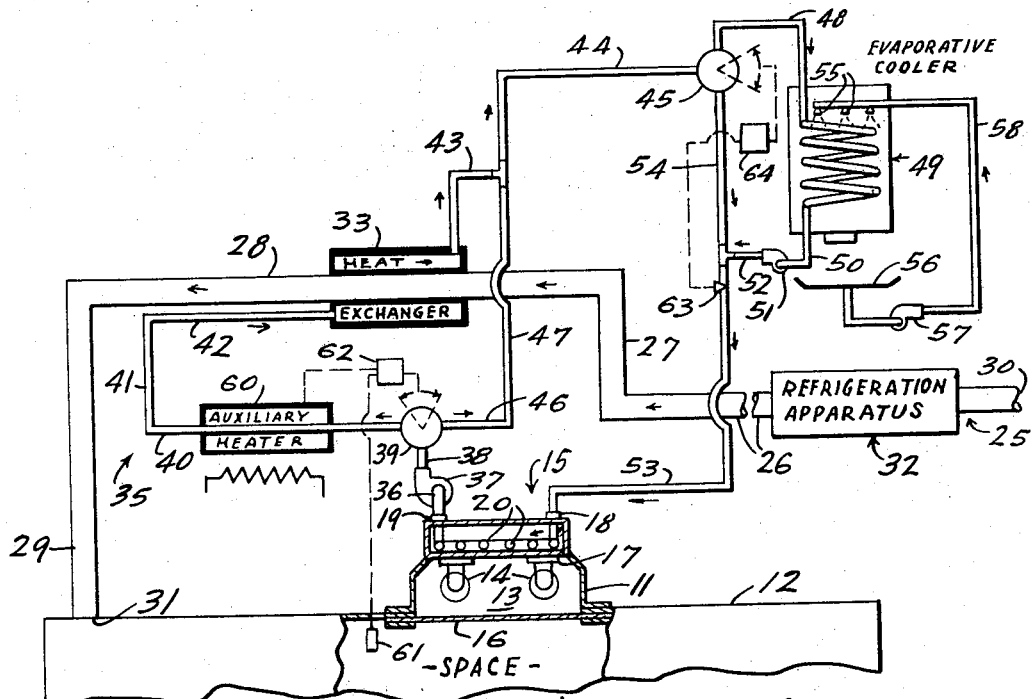
FIG-1-
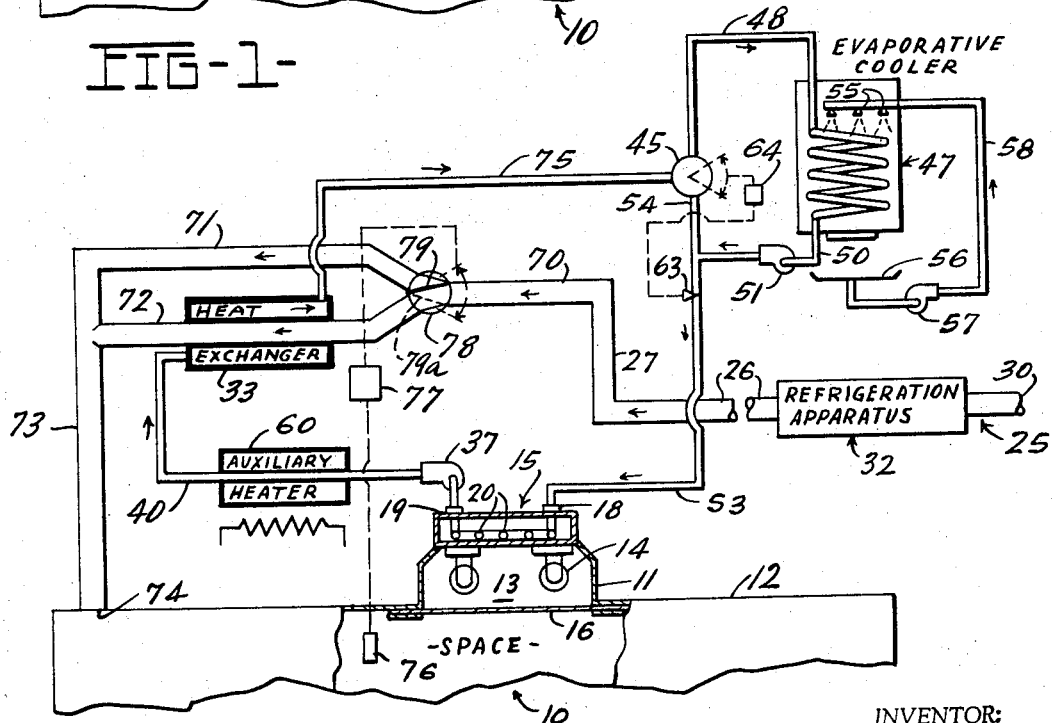
FIG-2-
INVENTOR:
GERSHON MECKLER.
BY
Owen + Owen
ATT'YS.

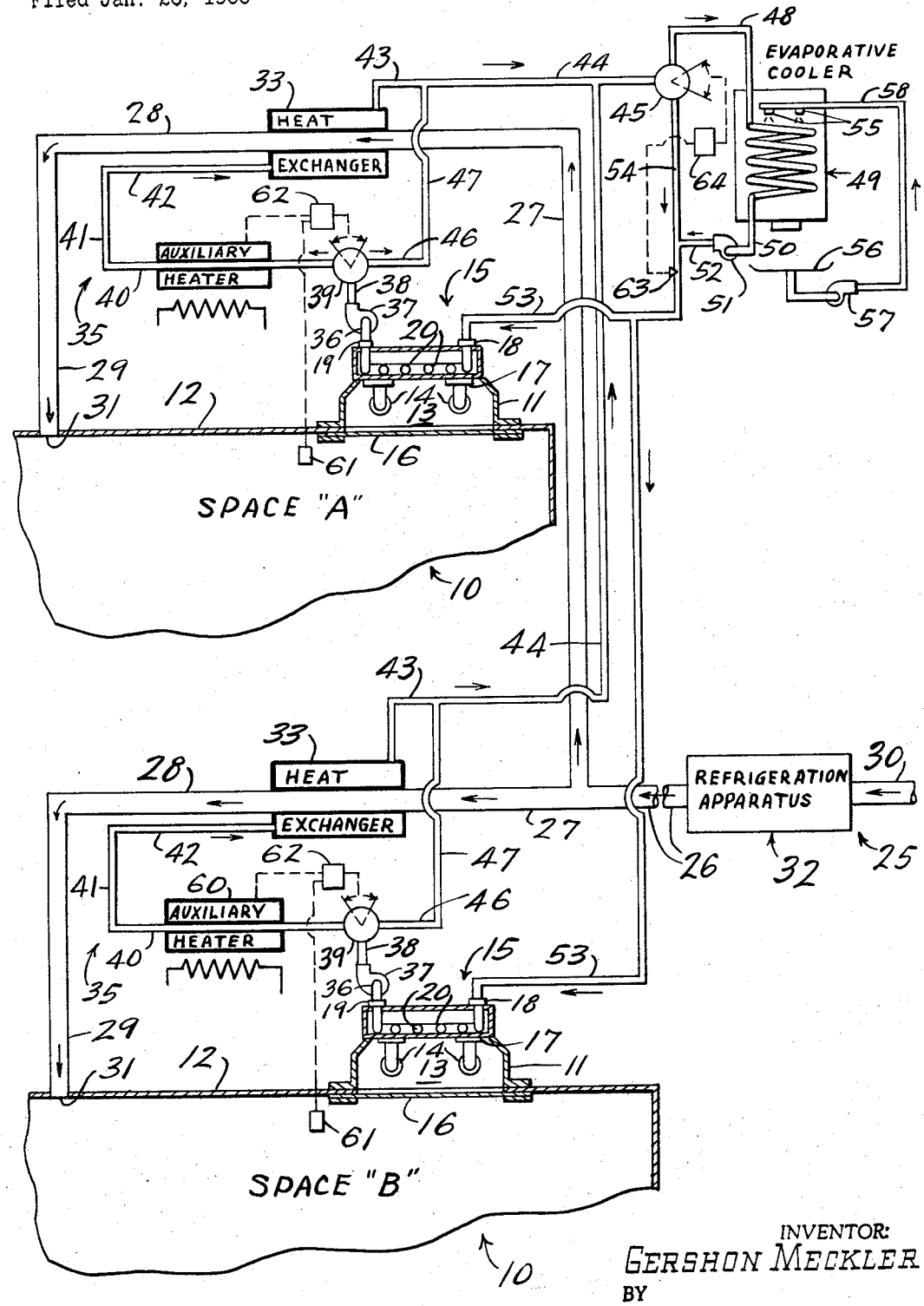
FIG-3-

3,401,742
COMFORT CONDITIONING SYSTEM
Gershon Meckler, Atlanta, Ga., assignor to Lithonia Lighting, Inc., Conyers, Ga., a corporation of Georgia
Filed Jan. 26, 1966, Ser. No. 523,113
11 Claims. (Cl. 165—22)

ABSTRACT OF THE DISCLOSURE

A comfort conditioning system including artificial light fixtures, having panel means effective to absorb lighting heat are positioned in each of a plurality of spaces. A duct system for supplying conditioned air to each of the spaces is provided and a heat exchanger is positioned adjacent the ductwork leading to each of the spaces. A heat transfer system is provided to transfer heat from the individual space panel means to the space heat exchanger. An auxiliary heater and the cooling means are also preferred components in the heat transfer system.

---

This invention relates to an improved comfort conditioning system and, more particularly, to a comfort conditioning system which utilizes energy present at a building zone in the regulation and maintenance of a predetermined space temperature at the zone.

It is the primary object of the invention to provide an improved comfort conditioning system.

It is another object of the present invention to provide an improved comfort conditioning system which can be utilized to condition a space throughout the year.

It is a further object of the invention to provide an improved comfort conditioning system which includes provisions for zone control reheating of conditioned air from energy present at the zone.

It is a still further object of the invention to provide an improved comfort conditioning system which includes the utilization of energy from lighting fixtures to heat one or more air streams which enter the zone or space which is being conditioned.

Other objects and advantages will be apparent from the description which follows, reference being made to the accompanying drawing, in which:

FIG. 1 is a diagrammatic view of a comfort conditioning system, according to the present invention;

FIG. 2 is a diagrammatic view of another embodiment of a comfort conditioning system, according to the present invention; and FIG. 3 is a diagrammatic view illustrating the use of the comfort conditioning system for a plurality of spaces.

Briefly, the present invention relates to apparatus for maintaining a building zone or a space at a generally predetermined space temperature. The system includes lighting fixtures having artificial light sources which give off heat at a temperature above the predetermined space temperature. Panel means are positioned generally adjacent the artificial light sources for absorbing heat from the light sources at a temperature level above the predetermined space temperature. Air flow means are provided for circulating conditioned air to the space. The system also includes heat transfer means for heating the conditioned air which is circulated by the air flow means and a heat transfer system which is effective to transfer heat from the panel means to the heat transfer means.

Referring to the drawings, a building space to be conditioned is indicated generally at 10. A lighting fixture 11 is positioned in a ceiling 12 of the space 10 and is normally one of a series of such lighting fixtures. The fixture 11 includes end supports 13 for a pair of lamps 14, panel means 15 positioned generally adjacent the lamps 14 and a diffuser panel 16 positioned below the lamps 14.

The diffuser panel 16 transmits and diffuses light received from the lamps 14, for example fluorescent type lamps, into the space 10. However, the diffuser panel 16 reflects radiant heat energy received from the lamps 14 upwardly toward the panel means 15.

The panel means 15 includes an absorbing surface 17 positioned above the lamps 14, a fluid inlet 18, a fluid outlet 19, and a plurality of heat exchange coils 20. A heat transfer fluid enters the fluid inlet 18, passes through the heat exchange coils 20, and is discharged through the fluid outlet 19. While passing through the heat exchange coils 20, the heat transfer fluid absorbs heat from the lamps 14 at a temperature level above a predetermined temperature within the space 10.

Air flow means are generally indicated by the reference number 25. In the present embodiment, the air flow means 25 includes interconnected ducts 26, 27, 28, and 29, an air inlet 30, and an air outlet 31 through which conditioned air is discharged to the space 10. After air is received by the air inlet 30, it passes through refrigeration apparatus 32 and is cooled to a temperature level below the predetermined temperature of the space 10. The refrigeration apparatus 32 is normally located at a location in the building which is removed from the space 10, for example, in a central equipment room.

The refrigeration apparatus 32 is commonly of the compressor-condenser-evaporator type. However, other types of refrigeration apparatus are also within the contemplation of the present invention. The apparatus chosen is determined by the temperature-humidity requirements of the air entering the duct 26. Other types of refrigeration apparatus utilized in the present invention are, for examples, an absorption cycle refrigerating machine; compressor-condenser-evaporator apparatus used in combination with a single or multi-stage chemical dehumidifier system; and compressor-condenser-evaporator apparatus used in combination with chemical dehumidification and an adiabatic washer. The latter refrigeration equipment is used where extremely low temperature and low humidity conditioned air is required.

The present invention contemplates the use of a single conditioned air duct system as opposed to a duel duct system where one duct system is utilized to supply warm reheat air. In the present system, conditioned air is normally supplied to the duct 26 at a temperature appreciably below the predetermined space temperature and any necessary reheating is done in the zone adjacent the space 10 without the necessity of a reheating duct system. More specifically, the present invention contemplates a zone control reheat system which utilizes energy present at the zone for the purpose of providing at least a portion of the reheat energy.

Heat transfer means are provided for heating the air circulated by the air flow means 25. Referring to FIG. 1, the heat transfer means comprises a heat exchanger 33 which is in thermal communication with the conditioned air within the duct 28.

A heat transfer system is generally indicated by the reference number 35. The system 35 includes a conduit 36 connected to the fluid outlet 19, a circulating pump 37, a conduit 38 extending between the pump 37 and a regulating valve 39 and a series of interconnected conduits 40, 41, and 42 which extend between the regulating valve 39 and the heat exchanger 33. The above mentioned portions of the heat transfer system 35 comprise circulating means for transferring the heat transfer fluid from the panel means 15 of the lighting fixture 11 to the heat exchanger 33.

The heat transfer system 35 also includes a conduit 43 which extends between the discharge side of the heat exchanger 33 and a conduit 44 leading to a regulating valve 45. A by-pass line consisting of by-pass conduits 46 and 47 extends between the regulating valve 39 and the juncture of the conduits 43 and 44. The arrows in the drawings, adjacent the respective conduits, indicate the normal direction of flow of the heat transfer fluid and check valves (not shown) are provided in the heat transfer system 35 to prevent reverse flow.

A conduit 48 extends between the regulating valve 45 and an evaporative cooler 49. In this embodiment, the heat transfer system 35 also includes a conduit 50 leading from the cooler 49 to a circulating pump 51, a conduit 52, and a return line 53 which is connected to the fluid inlet 18 of the panel means 15. A cooler by-pass line 54 extends between the regulating valve 45 and the junction of the conduit 52 and the return line 53. It should be noted that numerous changes in piping may be made without departing from the scope of the present invention.

Cooling is achieved in the evaporative cooler 49 by the evaporation of water directed from a series of spray nozzles 55. The evaporative cooler water is received by a pan 56 and from a make-up water source (not shown). The water received in the pan 56 is circulated by a pump 57 through a conduit 58 which is in fluid communication with the spray nozzle 55. Normally, the evaporative cooler 49 or some other type of cooler means, is positioned adjacent each zone to be conditioned rather than in a central equipment room. For example, an evaporative cooler 49 can be positioned on each floor of a building to serve the several individual zones on that particular floor.

FIGURE 3 illustrates the use of a single evaporative cooler 49 and a single refrigeration apparatus 32 to serve two spaces 10 in a building.

In the embodiment shown in FIG. 1, an auxiliary heater 60 is positioned adjacent the conduit 40 and is in heat exchange relationship with the heat exchange fluid passing therethrough.

Control means responsive to the predetermined space temperature and effective to control heat transfer from the heat exchanger 33 and the auxiliary heater 60 to the conditioned air circulated through the air flow means 25 are provided in a comfort conditioning system according to the present invention. Referring to FIG. 1, the control means includes a thermocouple device which is positioned within the space, for example a thermostat 61. When the actual space temperature drops below the predetermined space temperature, an electrical-mechanical control 62 is actuated by the thermostat 61 and the regulating valve 39 is moved to a position whereby the heat transfer fluid discharged from the pump 37 is directed through the conduits 40, 41, and 42, directly to the heat exchanger 33. Energy absorbed by the panel means 15 of the lighting fixture 11 is transferred as heat energy to conditioned air which is flowing through the duct 28. If the actual temperature of the space 10 is still below the predetermined desired temperature of the space, the auxiliary heater 60 is energized thereby supplying more heat to the heat exchanger 33 and to the conditioned air which is circulated through the duct 28.

If the actual temperature within the space 10 exceeds the predetermined temperature of the space, the regulating valve 39 is moved to a position where the heat transfer fluid discharged from the circulating pump 37 enters the by-pass conduit 46. In this event, the heat transfer fluid by-passes the air flow means 25 and there is no heat exchange between the heat transfer fluid and the conditioned air within the air flow means 25. Preferably, the regulating valve 39 has several intermediate positions wherein predetermined portions of the heat transfer fluid from the pump 37 enters both the conduit 40 and the by-pass conduit 46.

The temperature of the heat exchange fluid within the return line 53 is at a predetermined return temperature level. Cooler control means responsive to the predetermined return temperature and effective to regulate heat transfer fluid flow through the evaporative cooler 49 and through the cooler by-pass line 54 include a thermocouple device 63. During normal operation the heat transfer regulating valve 45 is so positioned that the heat transfer fluid is directed through the conduit 48 and the evaporative cooler 49. After the heat transfer fluid leaves the evaporative cooler 49 it is pumped by the circulating pump 51 into the return line 53 which is connected to the fluid inlet 18 of the lighting fixture 11.

If the actual temperature in the return line 53 drops below the predetermined return temperature level, the thermocouple device 63 actuates an electrical-mechanical control 64 which moves the regulating valve 45 to a position where the heat transfer fluid from the conduit 44 enters the cooler by-pass line 54. If the actual temperature in the return line 53 again exceeds the predetermined return temperature, the regulating valve 45 is returned to its original position and the heat transfer fluid passes through the evaporative cooler 49.

By way of example, if the space 10 is located within an interior zone of a building and the predetermined space temperature desired is 75° F. with a 50% relative humidity, the temperature of the heat exchange fluid leaving the fluid outlet 19 of the lighting fixture 11 ranges between 79° F. and 87° F. After passing through the refrigeration apparatus 32 the conditioned air within the air flow means 25 ranges between 55° F. and 65° F., while the temperature range of conditioned air entering the space 10 ranges between 55° F. and 80° F. The predetermined return temperature level of the heat transfer fluid within the return line 53 ranges between 77° F. and 85° F.

Referring to FIG. 2, a second embodiment of the present invention is shown. In this embodiment, the air flow means 25 comprises the refrigeration apparatus 32, the ducts 26 and 27, a duct 70 having split runs 71 and 72, and a discharge duct 73 having an air outlet 74. In this embodiment, the heat exchanger 33 is positioned adjacent the duct run 72 and a conduit 75 connects the discharge side of the heat exchanger 33 to the regulating valve 45.

The control means, which is effective to control heat transfer from the heat transfer means to the air circulated in the air flow means 25, comprises a thermocouple type thermostat 76 which is positioned in the space, an electrical-mechanical control 77, and a regulating valve 78 positioned in the duct 70 at the entrance of the runs 71 and 72. The regulating valve 78 comprises a swinging baffle 79. The baffle 79 as shown in a solid line position in FIG. 2 closes the entrance to the by-pass run 71 and the conditioned air is discharged from the duct 70 into the run 72. As the conditioned air passes through the run 72 it absorbs heat from the heat exchanger 33. It then enters the discharge duct 73 and is discharged into the space 10 through the air outlet 74.

When the actual temperature within the space 10 exceeds the predetermined space temperature, the thermostat 76 actuates the electrical-mechanical control 77 which moves the baffle of the regulating valve 78 to a position 79a indicated by the dashed line in FIG. 2. When this occurs, the conditioned air from the duct 70 enters the by-pass run 71, passes through the discharge duct 73 and is discharged through the air outlet 74 into the space 10. It is sometimes desirable to move the regulating valve 78 to an intermediate position where predetermined portions of the conditioned air enter each of the duct runs 71 and 72.

While the present invention has been disclosed in connection with specific arrangements and dispositions of the parts, it should be expressly understood that numerous modifications and changes can be made without departing from the scope of the appended claims.

I claim:

1. Apparatus for maintaining each of a plurality of spaces of a building at a generally predetermined temperature, said apparatus comprising, in combination, an artificial light source positioned in each of such spaces which gives off heat at a temperature appreciably above said predetermined temperature, panel means positioned in each of such spaces generally adjacent said artificial light sources for absorbing heat from said artificial light sources, a plurality of air flow means, means for cooling air circulated by each of said air flow means, each of said air flow means being operative to circulate cooled air to a different one of such spaces within the building, a plurality of heat transfer means, one for heating air circulated by each of said air flow means, a heat transfer system effective to transfer heat from said panel means to each of said heat transfer means, and a plurality of control means, each of said control means being responsive to a temperature within a different one of such spaces, and each of said control means being effective to control the transfer of heat to the appropriate one of said heat transfer means to maintain substantially constant the space temperature to which it is responsive.

2. Apparatus according to claim 1 wherein said heat transfer system includes means for circulating a heat transfer fluid from said panel means to said heat transfer means and back to said panel means, and bypass means for circulating the heat transfer fluid from said panel means and back thereto, and wherein said space control means includes valve means effective to regulate heat transfer fluid flow in said circulating means and said bypass means.

3. Apparatus according to claim 1 wherein said air flow means includes an air flow duct in thermal communication with said heat transfer means, a bypass duct effective to transfer circulated air to each of such spaces, and wherein said space control means includes valve means effective to regulate air flow in said air flow duct and said bypass duct.

4. Apparatus for maintaining each of a plurality of spaces of a building at a generally predetermined temperature, said apparatus comprising, in combination, artificial light sources positioned in each of such spaces which give off heat at a temperature appreciably above said predetermined temperature, panel means positioned in each of such spaces generally adjacent said artificial light sources for absorbing heat from said artificial light sources at a temperature level above said pretetermined temperature, a plurality of air flow means, means for cooling air circulated by each of said air flow means, each of said air flow means being operative to circulate cooled air to a different one of such spaces within the building, a plurality of heat transfer means, one for heating air circulated by each of said air flow means, a plurality of control means, each of said control means being operatively associated with a different one of such spaces, each responsive to the temperature of its associated space and each effective to control heat transfer from said heat transfer means to the air circulated by said air flow means to its associated space, a heat transfer system effective to transfer heat from said panel means to said heat transfer means, said system including means for circulating a heat transfer fluid from said panel means to said heat transfer means and back to said panel means, bypass means for circulating the heat transfer fluid from said panel means and back thereto, and cooler means effective to cool the heat transfer fluid.

5. Apparatus according to claim 4 wherein said control means includes valve means effective to regulate heat transfer fluid flow in said circulating means and said bypass means and wherein said cooler means comprises an evaporative cooler.

6. Apparatus according to claim 5 wherein said circulating means includes a return line connected to said panel means, said heat transfer system including a cooler panel bypass line and cooler control means effective to maintain heat transfer fluid recirculated to said panel means at a generally constant temperature.

7. Apparatus according to claim 4 wherein said air flow means includes an air flow duct in thermal communication with said heat transfer means, a bypass duct effective to transfer circulated air to each of such spaces, and wherein said space control means includes valve means effective to regulate air flow in said air flow duct and said bypass duct.

8. Apparatus according to claim 7 wherein said circulating means includes a return line connected to said panel means, said heat transfer system including a cooler bypass line and cooler control means effective to maintain heat transfer fluid recirculated to said panel means at a generally constant temperature.

9. Apparatus according to claim 6 including auxiliary heat means in thermal communication with the air circulated by said air flow means.

10. Apparatus for maintaining each of a plurality of enclosed spaces at a predetermined temperature comprising, in combination, a lighting fixture positioned in each of said spaces, each of said lighting fixtures including panel means having a passage means for circulating a heat transfer fluid therethrough, diffuser means spaced from said panel means for transmitting and diffusing light incident thereon and for reflecting radiant heat energy towards said panel means and an artificial light source spaced between said panel means and said diffuser means, such artificial light source giving off heat at a temperature above such predetermined space temperature, said panel means being effective to absorb heat from said artificial light source to raise the temperature of heat transfer fluid in the passage of said panel means, air flow means including a plurality of ducts, means for cooling air circulated by each of said ducts, each of said ducts being operative to circulate cooled air to a different one of said spaces, a plurality of heat transfer means, one for heating air circulated through each of said ducts, and a heat transfer system effective to circulate heat transfer fluid from the passage of said panel means to said heat transfer means and from said heat transfer means back to the passage of said panel means.

11. Apparatus for maintaining an enclosed space at a predetermined space temperature comprising, in combination, a lighting fixture, said lighting fixture including panel means having a passage means for circulating a heat transfer fluid therethrough, diffuser means spaced from said panel means for transmitting and diffusing light incident thereon and for reflecting radiant heat energy towards said panel means, an artificial light source spaced between said panel means and said diffuser means, such artificial light source giving off heat at a temperature above the predetermined space temperature, said panel means effective to absorb heat from said artificial light source thereby raising the temperature level of such heat transfer fluid above said predetermined space temperature, air flow means including a duct for circulating air to said space, heat transfer means for heating air circulated through said duct, cooler means effective to cool the heat transfer fluid, a heat transfer system including means for circulating a heat transfer fluid from said panel means to said heat transfer means and back to said panel means, bypass means for circulating the heat transfer fluid from the panel and back thereto, a return line connected to said panel means, the transfer fluid with said return line passing therethrough at a predetermined return temperature, a cooler bypass line, control means responsive to the predetermined space temperature effective to control heat transfer from said heat transfer means to the air circulated by said air flow means including valve means effective to regulate heat transfer fluid flow in said circulating means and said bypass means, and cooler control means responsive to the predetermined return temperature and effective to regulate the heat transfer fluid flow through said cooler means and through said cooler bypass line.

References Cited

UNITED STATES PATENTS

| | | | |
|---|---|---|---|
| 2,264,544 | 12/1941 | Newton | 165—21 |
| 3,065,686 | 11/1962 | Geocaris | 98—40 |
| 3,090,434 | 5/1963 | Benson et al. | 165—50 |

ROBERT A. O'LEARY, *Primary Examiner.*

M. A. ANTONAKAS, *Assistant Examiner.*